United States Patent
Poling et al.

(10) Patent No.: US 10,062,460 B2
(45) Date of Patent: Aug. 28, 2018

(54) CONTROL ROD DEVICE MECHANISM INNER DIAMETER ANNULUS ULTRA HIGH PRESSURE CAVITATION PEENING

(71) Applicant: AREVA Inc., Lynchburg, VA (US)

(72) Inventors: Gary R. Poling, Forest, VA (US); Doug M. Lawrence, Rustburg, VA (US); Bradley H. Graham, Lynchburg, VA (US); David J. Peckham, Madison Heights, VA (US)

(73) Assignee: Framatome Inc., Lynchburg, VA (US)

( * ) Notice: Subject to any disclaimer, the term of this patent is extended or adjusted under 35 U.S.C. 154(b) by 944 days.

(21) Appl. No.: 14/554,517

(22) Filed: Nov. 26, 2014

(65) Prior Publication Data

US 2016/0358680 A1     Dec. 8, 2016

(51) Int. Cl.
   *G21C 19/00*     (2006.01)
   *C21D 7/04*     (2006.01)
   *G21C 19/20*     (2006.01)
   *G21C 17/022*     (2006.01)

(52) U.S. Cl.
   CPC .............. *G21C 19/00* (2013.01); *C21D 7/04* (2013.01); *G21C 17/0225* (2013.01); *G21C 19/207* (2013.01); *G21Y 2002/103* (2013.01)

(58) Field of Classification Search
   CPC .. G21C 17/0225; G21C 19/00; G21C 19/207; C21D 7/04; C21D 7/06; B05B 7/025; B05B 13/0627; B05B 13/0636; B24C 3/32; B24C 3/325
See application file for complete search history.

(56) References Cited

U.S. PATENT DOCUMENTS

| | | | |
|---|---|---|---|
| 3,402,583 A * | 9/1968 | Burney | ................. B24C 3/06 |
| | | | 451/38 |
| 4,425,298 A | 1/1984 | Shields | |
| 5,305,361 A | 4/1994 | Enomoto et al. | |
| 5,307,661 A | 5/1994 | Fink et al. | |
| 5,499,519 A * | 3/1996 | Brunier | ................. B24C 3/04 |
| | | | 451/39 |
| 5,533,106 A | 7/1996 | Blumhardt | |
| 5,778,713 A | 7/1998 | Butler et al. | |

(Continued)

FOREIGN PATENT DOCUMENTS

| | | | |
|---|---|---|---|
| JP | H09 136261 A | 5/1997 | |
| JP | H10 118931 A | 5/1998 | |

OTHER PUBLICATIONS

International Search Report, PCT/US2015/061504.

*Primary Examiner* — Edward Tolan
(74) *Attorney, Agent, or Firm* — Davidson, Davidson & Kappel, LLC

(57) ABSTRACT

A sealing member is provided to create a sealed region about an annulus formed between an inner body, such as a thermal sleeve, and an outer body, such as a control rod drive housing nozzle. Liquid is introduced into the sealed region to create a flooded region, which is pressurized to a desired level. A nozzle is provided into the flooded region, the nozzle being configured to fit within the annulus. Pressurized fluid is ejected from the nozzle, causing the formation of cavitation bubbles. The nozzle flow causes the cavitation bubbles to settle on the surfaces forming the annulus. The collapsing impact of the cavitation bubbles imparts compressive stress in the materials of the surfaces forming the annulus.

14 Claims, 8 Drawing Sheets

(56) References Cited

U.S. PATENT DOCUMENTS

| | | |
|---|---|---|
| 6,341,151 B1 | 1/2002 | Enomoto et al. |
| 6,345,083 B1 | 2/2002 | Enomoto et al. |
| 6,425,276 B1 | 7/2002 | Hirano et al. |
| 6,519,991 B2 | 2/2003 | Hirano et al. |
| 6,639,962 B2 | 10/2003 | Enomoto et al. |
| 6,855,208 B1 | 2/2005 | Soyama |
| 6,993,948 B2 | 2/2006 | Offer |
| 8,331,522 B2 | 12/2012 | Ono et al. |
| 2013/0074561 A1 | 3/2013 | Alberts |
| 2013/0174627 A1 | 7/2013 | Aoki et al. |
| 2013/0233040 A1 | 9/2013 | Butler |

* cited by examiner

CONTROL ROD DEVICE MECHANISM INNER DIAMETER ANNULUS ULTRA HIGH PRESSURE CAVITATION PEENING

BACKGROUND OF THE INVENTION

1. Field of the Invention

The present invention relates to apparatus and method for performing cavitation peening, and, more particularly, the present invention relates to cavitation peening within a narrow annulus.

2. Description of the Related Art

Peening is a process of introducing mechanical stress into the surf e layer of a part to compress and strengthen it against future fractures and wear. Peening can be performed in a variety of manners, including shot peening, laser peening and cavitation peening. Cavitation peening involves the application of bubbles onto the surface with the part in a liquid environment. The collapsing of the bubbles imparts impactive forces to the part. One difficulty with prior cavitation peening apparatus and methods is the difficulty in peening within narrow spaces because the peening nozzle does not fit with such tight spaces.

While the present invention may be used in a variety of industries, the environment of nuclear power plant will be discussed herein for illustrative purposes. A nuclear power plant has a nuclear reactor housed within a pressure vessel and a reactor coolant system (RCS) for removing heat from the reactor and to generate power. Nozzles are attached to the vessels and/or piping for a number of purposes, such as for connecting piping and instrumentation, providing vents, and securing control element mechanisms and heater elements.

The nuclear industry is required to perform inspections of such nozzles, as well as their welds, due to the emergence of primary water stress corrosion cracking (PWSCC). Stress corrosion cracking occurs in a material due to a combination of a corrosive environment and tensile forces placed on the material. Cracking can be induced in materials in different ways including cold forming, welding, grinding, machining, and heat treatment as well as other physical stresses placed on the material. Stress corrosion cracking in nuclear reactor environments is a significant phenomenon that must be carefully monitored for successful operation of a nuclear power plant facility. Without careful monitoring for PWSCC, material defects may begin and may ultimately damage the material. If cracking continues, the materials may be damaged to such an extent that the materials must be removed from service and replaced. In the nuclear reactor environment, such replacement of components is extremely undesirable due to radiological concerns related to worker and facility safety, as well as overall plant economic concerns.

Thus, what is needed is an apparatus and method of mitigating or preventing the initiation of stress corrosion cracking.

SUMMARY OF THE INVENTION

A sealing member is provided to create a sealed region about an annulus formed between an inner body, such as a thermal sleeve, and an outer body, such as a control rod drive nozzle. Liquid is introduced into the sealed region to create a flooded region, which is pressurized to a desired level. A nozzle is provided into the flooded region, the nozzle being configured to fit within the annulus. Pressurized fluid is ejected from the nozzle, causing the formation of cavitation bubbles. The nozzle flow causes the cavitation bubbles to settle on the surfaces forming the annulus. The collapsing impact of the cavitation bubbles imparts compressive stress in the materials of the surfaces forming the annulus. Tooling is provided to maneuver the nozzle within the flooded region so that all desired portions of the surfaces are treated.

DESCRIPTION OF THE DRAWINGS

The present invention is described with reference to the accompanying drawings, which illustrate exemplary embodiments and in which like reference characters reference like elements. It is intended that the embodiments and figures disclosed herein are to be considered illustrative rather than restrictive.

DETAILED DESCRIPTION OF THE INVENTION

The instant invention is an apparatus and method for cavitation peening within narrow spaces, such as the annulus between an inner body and an outer body. The nozzle of the present invention has an elongate body configured to fit within the annulus. The body has a first end with a first width and a first thickness, and a second end with a second width and a second thickness. The body is tapered in both width and thickness such that the second width is greater than the first width and the second thickness is greater than the first thickness. The body further has an arcuate profile configured to fit with the annulus. A discharge orifice is located in the narrow first end of the body.

The nozzle also includes a base coupled to the body at the second end of the body. The base defines an inlet for connecting to a source of peening fluid. The base and the body define a flow path therethrough to the discharge orifice.

A primary target application for the instant invention is the mitigation of the inner diameter (ID) surfaces of pressurized water reactor (PWR) reactor vessel closure head (RVCH) control rod drive housing (CRDH) nozzles.

Residual tensile stresses in nozzle material, weld material, and base metal cladding contribute to and exacerbate PWSCC. Changing the stress state from tensile to compressive can prevent PWSCC initiation, mitigating the need for costly and time consuming repairs. Peening provides asset life extension through elimination of the degradation process by imparting residual compressive stress to an object.

Figure 1:
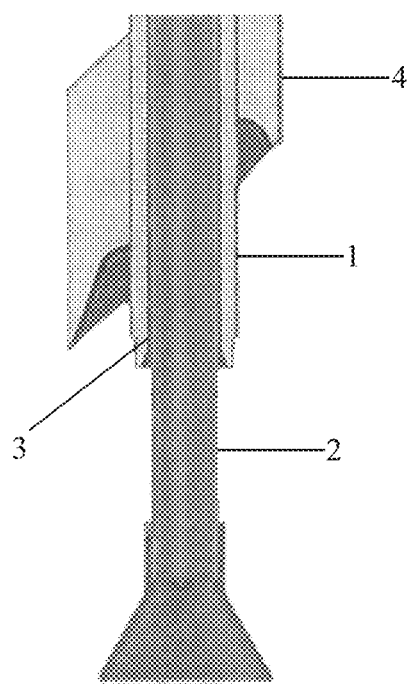
FIG. 1 shows a cross-sectional view of a typical arrangement for a control rod drive nozzle with a thermal sleeve in a reactor pressure vessel head.
Figure 2:
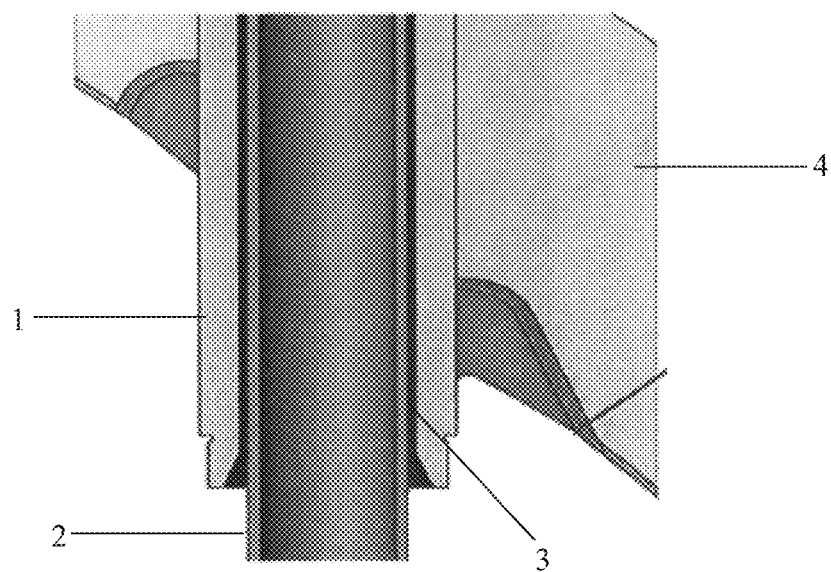
FIG. 2 shows a close-up cross-sectional view of the control rod drive nozzle, thermal sleeve, and reactor pressure vessel head of FIG. 1.

A thermal sleeve is incorporated into the design of many CRDH nozzles which restricts access to the inside surface of the CRDH nozzle. FIG. 1 shows a cross-sectional view of a typical arrangement for a CRDH nozzle 1 with a thermal sleeve 2 passing through a reactor pressure vessel head 4, and FIG. 2 shows a close-up cross-sectional view of the CRDH nozzle 1, thermal sleeve 2, and reactor pressure vessel head 4 of FIG. 1. The inside diameter of the CRDH nozzle 1 and the outside diameter of the thermal sleeve 2 form an annulus 3 therebetween. Due to the limited access, any work involving the inside diameter of the CRDH nozzle 1 usually requires removal of the thermal sleeve 2. Reattachment of the thermal sleeve 2 is generally required after work is completed. Such removal and reattachment of the thermal sleeve processes are costly, time consuming, and introduce risk. This invention allows for mitigation of stresses within the annulus 3 surfaces and eliminates the need to remove the thermal sleeve 2.

The cavitation peening process consists of directing a nozzle at the work surface through which water at high pressure and high velocity is discharged through a small orifice. Vapor bubbles are formed in the resulting high velocity water jet stream as it contacts the water at lower pressure. The pressure within each bubble is below the vapor pressure of the surrounding water medium. The bubbles collapse at the surface, generating high pressure shock waves on the work surface which impart compressive stresses on the surface. Typically, the process requires a back pressure to prevent the bubbles from prematurely collapsing.

A seal is installed about the base of the CRDH nozzle 1, sealing the annular gap so that the region can be flooded with water and pressurized to the desired back pressure (1 to 100 psi or greater, depending on the specific application). A cavitation peening nozzle penetrates the seal allowing access to the annular gap for delivery of the cavitation water jet stream. The cavitation peening process initiates and the peening nozzle (peening head) is driven to rotate by tooling around the axis of the CRDH nozzle 1 so that the entire ID surface of the CRDH nozzle 1 can be peened. As the peening head rotates the peening nozzle also actuates vertically up and down as needed for the optimal process effectiveness. In this manner, the cavitation peening process is implemented without having the entire component submerged in water.

Figure 3:
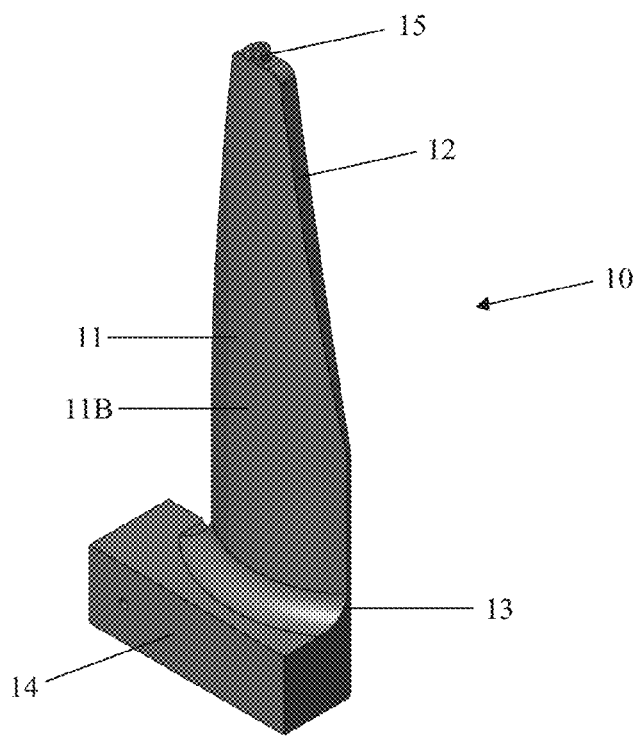
FIG. 3 shows a first view of a nozzle member of the present invention.
Figure 4:
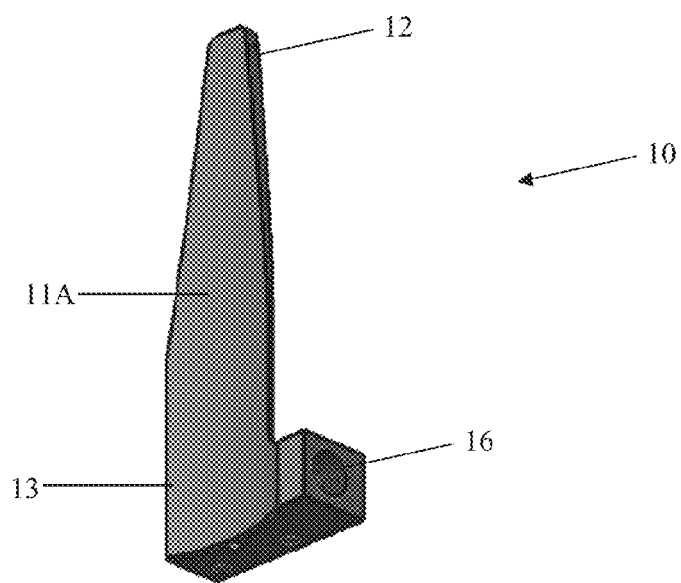
FIG. 4 shows a second view of the nozzle member of FIG. 3.

Preferably, the peening nozzle water pressure is approximately 50 ksi to 60 ksi with a back pressure of approximately 30 psi to 50 psi. These operational parameters allow for preferred cavitation bubble size, as well as a preferred amount of shock pressure being imparted to the treatment surface upon collapse of the cavitation bubbles. However, such operational conditions cause the nozzle to vibrate during use. This vibration can cause the nozzle to fail. Thus, a robust nozzle design is necessary. FIG. 3 shows a first view of a preferred nozzle 10 of the present invention, and FIG. 4 shows a second view of the nozzle 10. The nozzle 10 includes a body 11 having a proximal end 12 including a discharge orifice 15 and a distal end 13. To provide support and durability, the body 11 is tapered such that the nozzle distal end 13 has a greater width than does the proximal end 12. Preferably, the distal end width is two to four times the proximal end width. While the thickness of the nozzle 10 must be minimized so that the nozzle 10 will fit within the annulus 3, in a preferred embodiment the thickness is also tapered such that the distal end 13 has a greater thickness than does the proximal end 12. The maximum thickness of the nozzle 10 preferably is less than ⅛ inch to allow for insertion into and peening of the annulus surfaces.

Figure 8:
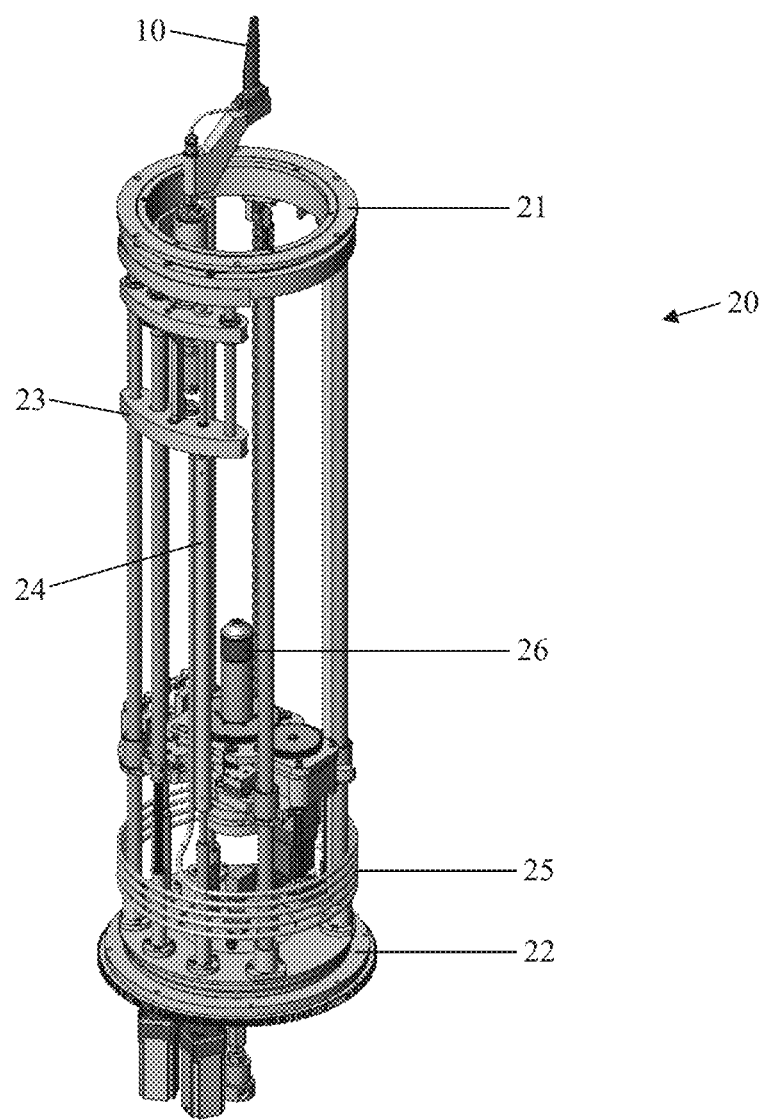
FIG. 8 shows a tooting assembly for moving the peening nozzle of FIG. 3.

The nozzle 10 further includes a base 14 at the distal end 13. The base 14 provides gripping surfaces so that the nozzle 10 can be gripped and retained by tooling to position and maneuver the nozzle 10. FIG. 8 shows an example of such tooling 20. The tooling includes a body 21 defining an enclosed area. A base plate 22 is rotationally coupled to the body 21, allowing for rotation of the body 21. A ring bearing is used to maintain the water-tight integrity of the base plate to body junction. A carriage assembly 23 connects the nozzle 10 to a lead screw 24, allowing for vertical movement of the nozzle 10. An additional drive allows for rotation of the carriage assembly 23 and nozzle 10. The carriage assembly 23 may also be movable radially relative to the body 21, to allow for peening of annuluses of varying diameter.

Figure 5:
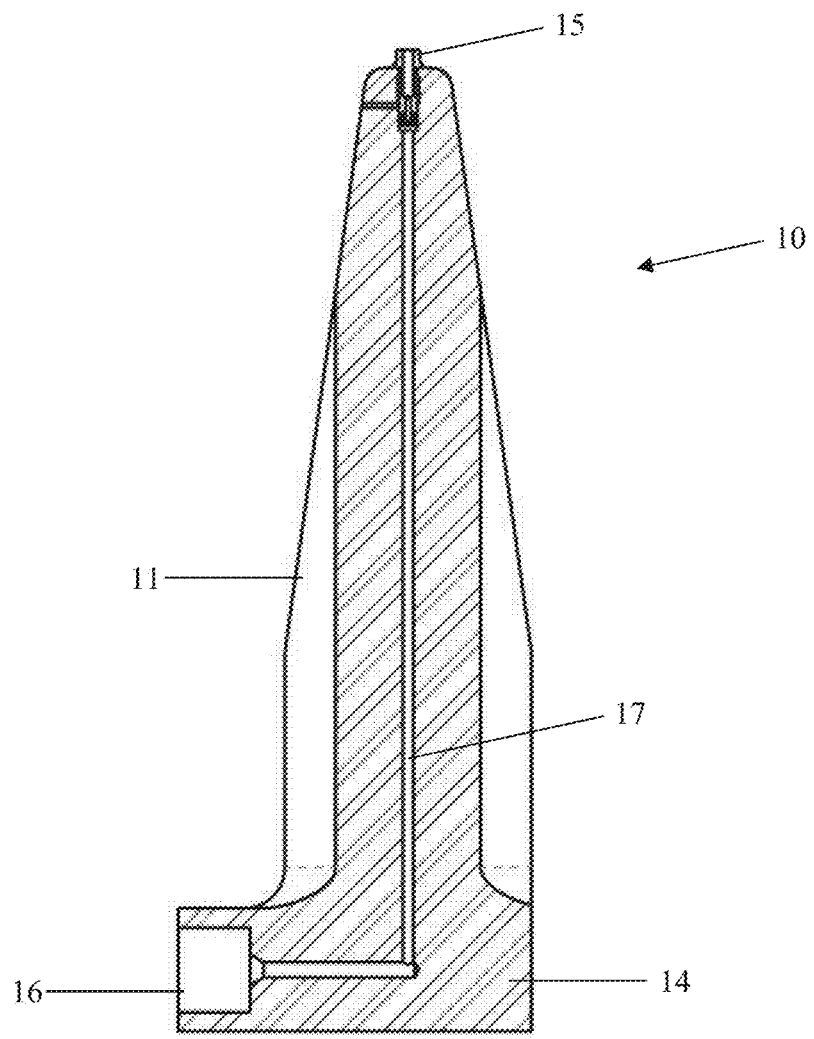
FIG. 5 shows a cross-sectional view of the nozzle member of FIG. 3.

The nozzle base 14 further includes an orifice 16 which allows a source of peening fluid to be attached. The orifice 16 is fluidly connected to the discharge orifice 15 via a passageway 17 (see FIG. 5) internal to the nozzle body 11. Preferably, the peening fluid is provided by a metallic tube 25 that can withstand the pressures imposed by the high pressure peening fluid. To allow for vertical displacement of the nozzle 10, the tubing 25 may be provided in a coil, with the coil stack positioned such that its central axis is vertical, parallel to the lead screw and perpendicular to the base plate 22. Thus, the coil central axis is parallel to or collinear with the longitudinal axis of the tooling body 21. As the nozzle 10 is moved upward (that is, away from the base plate 22), the coil is elastically deformed such that the spacing between adjacent coils is increased. Downward movement of the nozzle 10 returns the coils to their default position. The tubing coil 25 allows for linear movement of the nozzle 10 along the coil central axis.

Figure 6:
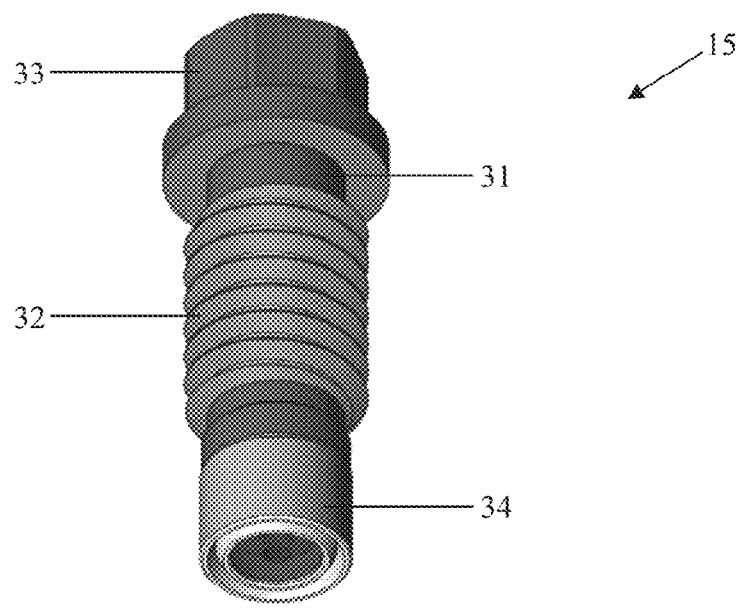
FIG. 6 shows an orifice insert for the nozzle member of FIG. 3.
Figure 7:
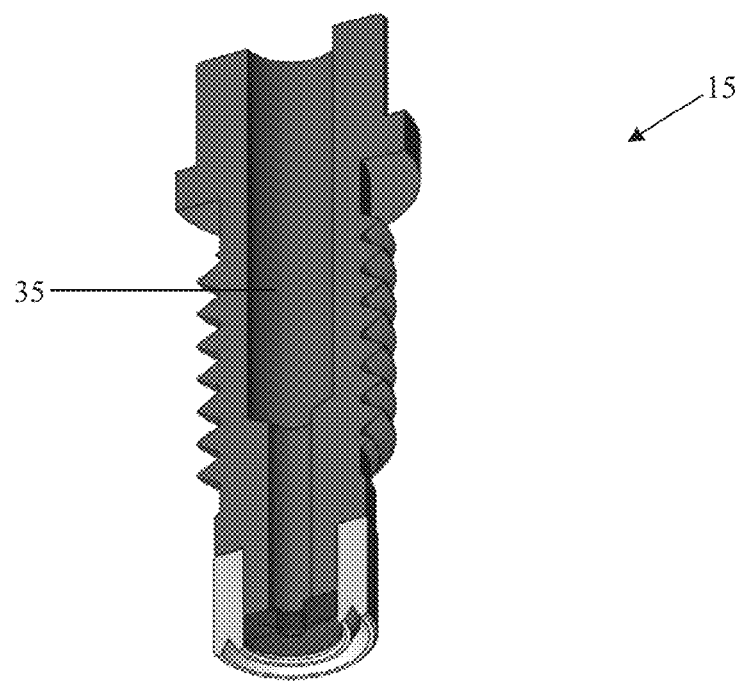
FIG. 7 shows a cross-sectional view of the orifice insert of FIG. 6.

FIG. 6 shows an orifice insert 15 for the nozzle 10, and FIG. 7 shows a cross-sectional view of the orifice insert 15. The insert 15 includes a body 31 having a threaded central portion 32. A head 33 is provided at a proximal end of the insert 15. The head 33 preferable includes engagement surfaces, such as a hex head bolt, configured to be engaged by a tool to allow the threaded portion 32 to be coupled with corresponding threading in the nozzle body 11. A seal 34 is provided at a distal end of the insert 15. Preferably, the seal 34 is formed of a polymer material. When the insert 15 is in its operational position within the nozzle body 11, the seal 34 abuts corresponding surfaces of the nozzle body 11. This ensures a water-tight seal between the orifice insert 15 and the nozzle body 11. A bore 35 is provided centrally within the insert 15 to define a flow path therethrough. A jewel member (not shown) having a bore therethrough may be positioned in the proximal tip of the insert 15.

Figure 9:
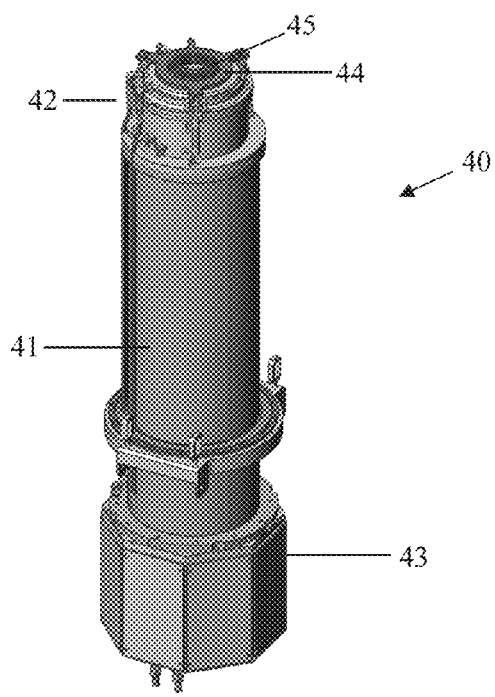
FIG. 9 shows a first view of a seal assembly for use with the peening nozzle of FIG. 3.
Figure 10:
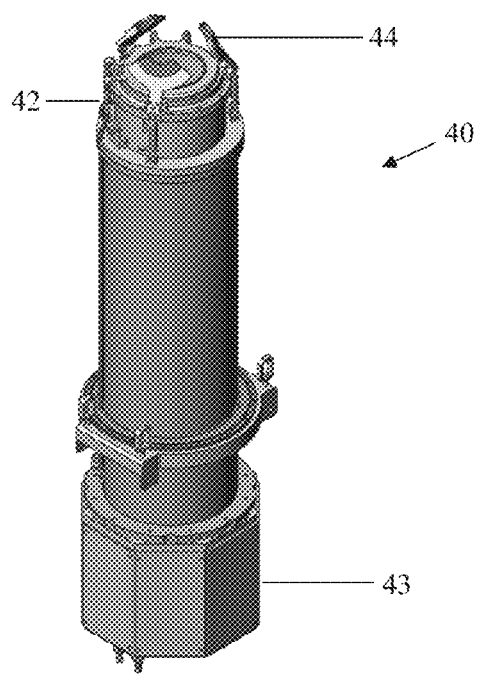
FIG. 10 shows a second view of the seal assembly of FIG. 9.

Cavitation peening requires that the nozzle and surface to be treated are in a liquid environment. Rather than placing the entire reactor pressure vessel head underwater, which would require substantial time and effort, as well as the creation of a large amount of waste water that must be disposed of, a seal assembly is used. FIG. 9 shows one such seal assembly 40. The seal assembly 40 includes a housing 41 that is configured to surround and enclose the tooling 20 and nozzle 10. The body 41 includes an actuated proximal end 42 and a closed distal end 43. The proximal end 42 contains three flat sealing surfaces 44 that open to avoid thermal sleeve funnels during installation and close to seal against the bottom of the CRDH nozzle 1. A gasket or seal 45 is molded into the sealing surfaces 44 to ensure water tight integrity of the seal assembly 40. Another alternative for the seal assembly 40 can be found in co-owned U.S. patent application Ser. No. 14/554,525 filed on even date herewith, which application is incorporated by reference herein in its entirety.

Stainless steel, such as 18-8 stainless steel, is a preferred material for the tooling 20 and seal assembly 40. Stainless steel, such as 17-4 PPH stainless steel, is a preferred material for the nozzle 10. Silicone is a preferred material for the seal 45.

In use, the reactor pressure vessel head is removed from the reactor and placed in a storage position within the containment building. (This is a routine step that is performed during refueling outages to allow access to the fuel rods and reactor core.) The nozzle 10 is coupled to the tooling 20, which is positioned within the seal assembly 40. The coupled assembly is then positioned about a CRDH nozzle 1 and thermal sleeve 2 to be serviced such that the seal 45 contacts the outer surface of the CRDH nozzle 1 or the inner surface of the head 4. The body 41 thus surrounds the tooling 20, CRDH nozzle 1, and thermal sleeve 2, forming a sealed region about the bottom of the CRDH nozzle 1.

Liquid, such as water, is then introduced into the sealed region, forming a flooded region. This may be accomplished in a known manner, such as by connecting a source of water to the seal body 41 through a valve and opening the valve. The sealed region is then pressurized to a predetermined pressure level, such as approximately 30 psi to 50 psi. This may be accomplished by continuing to supply water to the flooded region, raising the liquid level until the weight thereof results in the desired pressure level. This may entail raising the liquid level well into the annulus 3.

Figure 11:
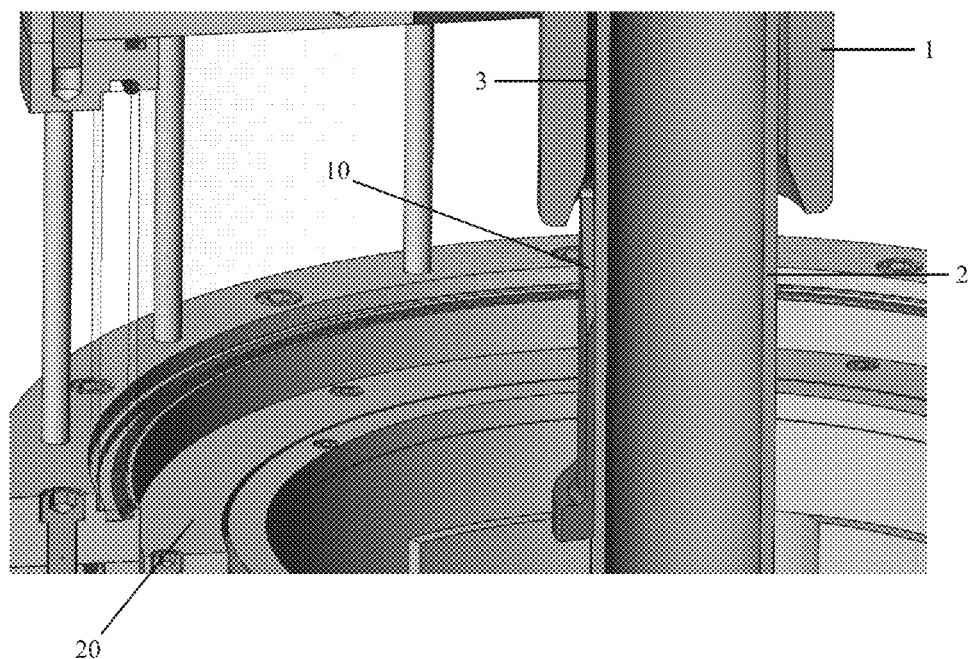
FIG. 11 shows the nozzle member of FIG. 3 in a use position inserted within the annulus formed between the control rod drive nozzle and thermal sleeve of FIG. 1.

The tooling 20 is then engaged to insert the nozzle 10 within the annulus. This is shown in FIG. 11. The nozzle body 11 is curved to matingly correspond to the curves of the CRDH nozzle 1 and thermal sleeve 2. Preferably, the inside surface 11A of the nozzle body 11 has a greater radius of curvature than does the outer surface 11B of the nozzle body 11. In the specific embodiment used in conjunction with the CRDH nozzle 1 and thermal sleeve 2 discussed herein, the inner surface 11A radius of curvature may be approximately 2 in. while the outer surface radius of curvature may be approximately 1.13 in. The radii of curvature are chosen to match the space in which the nozzle 10 is to be used, which in this example is the annulus 3. The low profile thickness of the nozzle body 11 allows it to fit within the annulus 3.

Optionally, the tooling 20 may be used to shift the thermal sleeve 20 within the CRDH nozzle 1 to a position diametrically opposed to the nozzle 10, providing additional clearance for inserting the nozzle within the annulus 3. The tooling may include a chuck 26 to grip the inner diameter of the thermal sleeve 2 and shift it in a direction away from the nozzle 10.

With the nozzle 10 positioned, flow of the pressurized peening fluid is initiated causing the peening process to begin. The pressurized flow through the nozzle 10 causes cavitation bubbles to form. The flow is directed substantially parallel to the surface(s) to be treated with a standoff distance (that is, the distance between the nozzle discharge orifice 15 and area of the surface to be treated) of approximately 5 in. to 7 in. The collapsing impact of the cavitation bubbles imparts compressive stress in the materials of the surfaces forming the annulus 3. The tooling 20 is used to maneuver the nozzle 10 circumferentially around and vertically up and down about the thermal sleeve 2 to treat all desired surfaces thereof. The nozzle 10 is also inserted within the annulus 3 to treat the outer surface of the thermal sleeve 2 and the inner surface of the CRDH nozzle 1. The nozzle 10 has an elongate shape, preferably having a longitudinal length of approximately 5 in. to 6 in., allowing it to extend well within the annulus 3. The nozzle length and standoff distance allow peening to 10 in. or more within the annulus 3.

Operational parameters such as peening nozzle water pressure, flow rate, back pressure, peening nozzle position, and peening nozzle velocity can be qualified by performing cavitation peening of a mock-up example assembly, and then destructively inspecting the mock-up parts to measure the compressive residual stresses imparted thereto. These parameters are measured and recorded during use, and these recordings provided to the customer, thereby ensuring that the intended surfaces were actually treated as intended.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. Thus the present invention should not be limited by the above-described exemplary embodiments, but should be defined only in accordance with the following claims and their equivalents. Furthermore, while certain advantages of the invention have been described herein, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

What is claimed is:

1. A peening assembly for peening the surface materials of an annulus formed between an inner body and an outer body, comprising:
    a nozzle having an arcuate body and a base, said arcuate body configured to fit within the annulus, the arcuate body having an arcuate shape and including an arcuate inner surface configured for facing the inner body and an arcuate outer surface configured for facing the outer body;
    tooling configured to move said nozzle in and around the annulus, said tooling including:
        an elongate tooling body having a longitudinal axis;
        a carriage coupled to said tooling body, said carriage configured to be coupled to said nozzle base, said carriage being movable longitudinally relative to said tooling body; and
        a tooling base rotatably coupled to said tooling body; and
    a seal assembly configured to envelope said nozzle and said tooling to define a sealed region about the inner and outer bodies.

2. The peening assembly of claim 1, wherein said tooling includes a conduit for transporting peening fluid, said conduit formed of a metallic material and including a coiled section having a longitudinal axis that is substantially parallel to or collinear with said tooling body longitudinal axis.

3. The peening assembly of claim 2, wherein said conduit includes a first end and a second end, said first end being connected to a source of peening fluid and said second end being connected to said nozzle.

4. The peening assembly of claim 1, wherein said tooling includes a chuck configured to fit within the inner body and shift the inner body in a direction away from said nozzle.

5. The peening assembly of claim 1, wherein said nozzle body has a first end with a first width and a first thickness and a second end with a second width and a second thickness, said second width greater than said first width, said second thickness greater than said first thickness, said nozzle having a discharge orifice in said first end.

6. The peening assembly of claim 5, wherein said first thickness is less than % inch.

7. The peening assembly of claim 5, further comprising an insert coupled to said body first end, said insert defining said discharge orifice.

8. The peening assembly as recited in claim 2 wherein the arcuate inner surface is concave and the arcuate outer surface is convex.

9. The peening assembly as recited in claim 8 wherein the arcuate body of the nozzle includes a discharge orifice at a distal end thereof, each off the arcuate inner surface and the arcuate outer surface tapering toward the discharge orifice at the distal end.

10. The peening assembly as recited in claim 9 wherein the nozzle base is at a proximal end of the arcuate body, the nozzle base including an inlet orifice fluidly connected to the discharge orifice by a passageway passing through the arcuate body, the nozzle base being configured for connecting to the tooling.

11. The peening assembly as recited in claim 10 wherein a first portion of the passageway extends between the arcuate inner surface and the arcuate outer surface in a first direction away from the tooling and toward the discharge orifice, the discharge orifice configured for discharging fluid in the first direction.

12. The peening assembly as recited in claim 11 wherein the passageway includes a second portion passing through the nozzle base for transporting fluid from the inlet orifice to the first portion of the passageway.

13. The peening assembly as recited in claim 10 wherein the second portion of the passageway extends in a second direction, the second direction being at an angle with respect to the first direction.

14. The peening assembly as recited in claim 10 wherein the tooling includes tubing fluidly connected to the inlet orifice, the tubing including an elastically deformable coiled section wrapped around a body of the tooling, the coiled section configured for allowing linear movement of the nozzle along a central axis of the coiled section.

* * * * *